United States Patent [19]
Asai et al.

[11] Patent Number: 6,074,098
[45] Date of Patent: Jun. 13, 2000

[54] HYDRO-DYNAMIC FLUID BEARING DEVICE AND MANUFACTURING METHOD OF THE SAME

[75] Inventors: Hiromitsu Asai; Katsuhiko Tanaka; Ikunori Sakatani; Hiromitsu Muraki, all of Fujisawa, Japan

[73] Assignee: NSK Ltd., Tokyo, Japan

[21] Appl. No.: 09/388,355

[22] Filed: Sep. 1, 1999

Related U.S. Application Data

[62] Division of application No. 09/033,781, Mar. 3, 1998.

[51] Int. Cl.[7] .................................................. F16C 17/10
[52] U.S. Cl. .......................... 384/112; 384/107; 384/123
[58] Field of Search .................................. 384/112, 123, 384/107, 113, 121

[56] References Cited

U.S. PATENT DOCUMENTS 3,758,177  9/1973  Williams .................................. 384/113
5,096,309  3/1992  Nakasugi et al. ........................ 384/112
5,791,784  8/1998  Ichiyama .................................. 384/107

FOREIGN PATENT DOCUMENTS 7-190048  7/1995  Japan .

*Primary Examiner*—Lenard A. Footland
*Attorney, Agent, or Firm*—Vorys, Sater, Seymour and Pease LLP

[57] ABSTRACT

A novel hydro-dynamic fluid bearing device is herein disclosed which comprises a cylindrical shaft, a substantially cylindrical bearing member for axially supporting the shaft rotatably in a cylindrical hole having a bottom surface, a supporting member fixed on one side of the shaft and the bearing member, and a rotation member fixed on the other side of the shaft and the bearing member and rotatably supported on the supporting member, grooves for generating hydro-dynamic fluid being formed on at least one of the outer peripheral surface of the shaft and the inner peripheral surface of the cylindrical hole of the bearing member, wherein the bearing member is made of a resin material, and the outer peripheral surface of the substantially cylindrical portion is fixed to an annular reinforcing member having a higher rigidity than the bearing member.

17 Claims, 10 Drawing Sheets

15

HYDRO-DYNAMIC FLUID BEARING DEVICE AND MANUFACTURING METHOD OF THE SAME

CROSS-REFERENCE TO RELATED APPLICATIONS

This application is a division of application Ser. No. 09/033,781 filed Mar. 3, 1998.

BACKGROUND OF THE INVENTION

1. Field of the Invention

The present invention relates to a hydro-dynamic fluid bearing device, more detailedly, to a hydro-dynamic fluid bearing device of a spindle motor for an information system, an audio/visual system or the like, especially, to a hydro-dynamic fluid bearing device of a spindle motor suitable for an optical disk system or a magnetic disk system, and also to a method of making a bearing member used in such a device.

2. Related Background Art

Sliding bearings, ball bearings or hydro-dynamic fluid bearings are conventionally used in information systems such as LBPs (laser beam printers) and CD-ROM drive systems. Bearing devices in DVD (digital video disk) systems, which are new information systems, are planned to employ such bearings and some of them are practically utilized.

Bearing devices for laser beam printers, CD-ROM drive systems or the like, require high rigidity, low friction and good durability.

However, conventional bearing devices have the following problems.

In a bearing device using a sliding bearing, a thrust bearing is required in addition to a radial bearing. The number of parts thus increases. Besides, shaft run-out is large. Such shaft run-out is apt to occur in accordance with the size of the gap between a radial bearing and a shaft. Furthermore, wear resistance is bad. Abrasion is apt to be heavy in particular when the rotational speed is high.

In a bearing device using a ball bearing, the ball bearing itself is expensive. Furthermore, rotation unevenness and vibration are apt to occur.

In a bearing device using a hydro-dynamic fluid bearing (made of metal), a thrust bearing is required in addition to a radial bearing. The number of parts thus increases. Besides, wear resistance is low because abrasion is easy to occur due to contact at the time of start or stop. Furthermore, the manufacturing cost is high because of the formation of grooves for generating hydro-dynamic fluid and the highly accurate finish of a bearing surface.

Considering the above problems, the present inventor et al. proposed a hydro-dynamic fluid bearing using a bearing member made of resin which is superior in anti-friction and wear resistance, and can be formed in one body by injection molding, and the cost of which is low. Such a bearing device, however, has the following new problem. Since the rigidity of resin is lower than that of metal, the bearing member made of resin is displaced (elastically deformed) when unbalance quantity (radial load) is large.

In recent years, the rotational speeds of fluid bearing devices for spindle motors of optical disk systems or magnetic disk systems are tend to increase because of the demand of the high speed transmission of data. In a supporting bearing of such a spindle motor, the influence of centrifugal force at a high speed rotation due to the unbalance of a rotation member becomes larger.

FIG. 12 shows a cross-sectional view of a prior art bearing device. A rotation member comprises a shaft 130, a disk attachment flange 131 and a rotor 133. The shaft 130 is rigidly inserted in the disk attachment flange 131. The rotor 133 is fixed to the lower surface of the disk attachment flange 131.

A support member for supporting the shaft 130 comprises a stator 134, a base 135, a bearing member 136 and a steel ball 137. For operating as a radial hydro-dynamic fluid bearing, grooves for generating hydro-dynamic fluid are formed in a cylindrical radial bearing surface 136a of the bearing member 136. The bearing member 136 is firmly inserted in the base 135. The steel ball 137 is tightly inserted in the lower end portion of the bearing member 136. The steel ball 137 operates as a thrust bearing. The stator 134 is firmly inserted in and fixed to the bearing member 136.

The operation will be described. When the stator 134 is electrified, a rotating magnetic field is generated. The rotor 133 thereby rotates together with the shaft 130 and the disk attachment flange 131. The pressure of a lubricant in a radial bearing gap thereby increases because of a pumping effect by the grooves for generating hydro-dynamic fluid formed in the radial bearing surface 136a. The rotor 133 thus rotates in non-contact state between the radial bearing surface 136a and a radial receiving surface 136b which were initially in contact with each other.

In the thrust bearing, a sliding bearing is formed by point contact between a thrust bearing surface 130a of an end surface of the shaft 130 and a thrust receiving surface 137a. The lubricant is disposed between the thrust bearing surface 130a and the thrust receiving surface 137a. The rotor 133 thus rotates in point contact state through the lubricant.

Synthetic oils having good boundary lubrication properties were studied for such a lubricant. Particularly, load capacities of the above radial and thrust bearings are in proportion to the viscosity of a lubricant used. Since the change of the viscosity of synthetic oil with the change of temperature are large, an oil which meets the necessary load capacity at a high temperature, largely increases in its viscosity at a low temperature so as to increase the dynamic torque of a bearing. Contrarily, if an oil having the viscosity where the optimum dynamic torque of a bearing is obtained at a low temperature, is chosen, the viscosity decreases at a high temperature so that the load capacity becomes insufficient. Because synthetic oils are inferior in their temperature-viscosity properties in general, the diameter of the shaft was 1.5 mm for lowering the torque of the bearing device, or the radial bearing gap between the radial bearing surface 136a and the radial receiving surface 136b was narrowed to 3 μm for insuring the necessary load capacity.

When the rotational speed of a bearing device becomes higher, however, the centrifugal force becomes larger due to the unbalance at the time of mounting a disk. The flexural rigidity of the shaft thus lacks, causing a problem that the run-out range of a rotational body becomes larger. Besides, in bearing devices, it is required to lower the torque at a low temperature because of a demand for saving the electric power to the device.

As another prior art, a dynamic air pressure bearing having a construction schematically shown in FIG. 13 is used in a scanner motor for polygon mirror in a laser printer which is an information system. A shaft 202, in the outer surface of which grooves 203 for generating hydro-dynamic fluid are formed, is inserted in a sleeve 201 which is a cylindrical member. A radial dynamic air pressure bearing for supporting the sleeve 201 in the radial direction to the shaft 202 is formed by utilizing an air pressure which is generated by the grooves 203 for generating hydro-dynamic fluid at the relative rotation of the sleeve 201 and the shaft 202. An end opposite to an end through which the shaft 202 is inserted, is closed with a thrust plate 204. A pair of permanent magnets 205 and 206 is mounted on the end surface of the shaft 202 and the inner surface of the thrust plate 204 opposite to the former, respectively, so as to repel each other. A thrust magnetic bearing for supporting the sleeve 201 in the axial direction to the shaft 202 is formed by the repulsion between the permanent magnets 205 and 206.

In the dynamic air pressure bearing as shown in FIG. 13, however, because of the construction where air of low viscosity and little lubrication is used as a lubricant fluid, it is required to finish in very high accuracy the bearing surfaces such as the inner surface of the sleeve 201 and the outer surface of the shaft 202. Besides, the good slidability of those bearing surfaces must be insured. For these purposes, after the inner surface of the sleeve 201 made of structural steel is ground or honed, the inner surface is coated with a composite plating in which polyethylene fluoride resin such as Teflon (trade name), that is, polytetrafluoroethylene is impregnated in nickel. The inner surface is again ground or honed to insure the dimensional accuracy. On the other hand, the grooves for generating hydro-dynamic fluid must be formed by etching in the outer surface of the shaft 202 made of stainless steel which cooperates with the sleeve 201.

As for the sleeve 201, because a thick plating can not be formed, two times of grinding or honing are required. There are problems that the manufacturing cost increases in addition to increasing the cost for plating. As for the shaft 202, there are problems that the process of etching is complex and has need of a long time and the cost increases. Since the magnetic bearing using the repulsion between the permanent magnets 205 and 206 is employed for the thrust bearing, there are problems that the construction is complex, the number of parts increases and the cost for manufacturing the whole of the bearing is high.

SUMMARY OF THE INVENTION

Accordingly, it is an object of the present invention to provide a hydro-dynamic fluid bearing device of high rigidity, low friction and good durability by reinforcing a bearing member made of resin with an annular member having higher rigidity than the bearing member made of resin.

It is another object of the present invention to provide a motor including a hydro-dynamic fluid bearing device of the decreased number of parts and low cost by using an annular member as a rotor or a stator of the motor.

For solving the above-described problems, in a hydro-dynamic fluid bearing device according to the first aspect of the present invention, a bearing member made of resin has a cylindrical radial bearing surface in a cylindrical hole, the radial bearing surface has grooves for generating hydro-dynamic fluid, and the bearing member is reinforced by the manner that the outer surface of the bearing member is fixed to an annular member which has the higher rigidity than the bearing member.

The outer surface of the bearing member may be reinforced by the manner that its both end portions in the axial direction are mounted to the annular member. The annular member may be a rotor included in the drive structure of the motor. The annular member may be a stator included in the drive structure of the motor.

Since the bearing member is reinforced by the annular member having the higher rigidity than the bearing member, a lack of the rigidity of the bearing member made of resin is complemented so that the bearing member made of resin is not displaced even in the case of the large unbalance quantity.

A motor of simple structure, the small number of parts and low cost can be obtained if the annular member is utilized as a rotor or a stator of the motor.

It is an object of a hydro-dynamic fluid bearing device according to the second aspect of the present invention to provide a hydro-dynamic fluid bearing device wherein the flexural rigidity of a shaft is to be improved and the problem that the run-out range of a rotational body becomes larger is solved, and the dynamic torque is to be decreased at a low temperature, by aiming at the shape of the bearing device and a lubricant.

A hydro-dynamic fluid bearing device is to provide a hydro-dynamic fluid bearing device in which a cylindrical radial bearing surface of a bearing member is opposite through a radial bearing gap to a radial receiving surface of a shaft, and grooves for generating hydro-dynamic fluid are formed in at least one of the radial receiving surface and the radial bearing surface, characterized in that the diameter of the shaft is 2 to 5 mm, a fluoric oil the kinematic viscosity of which is 20 to 200 cSt at 40° C. is used as a lubricant in the radial bearing gap, and the radial bearing gap is 3.5 to 10 $\mu$m.

Since the diameter of the shaft is 2 to 5 mm, the flexural rigidity of the shaft is improved. Within this range, it is possible to decrease the run-out range of a rotation member which is a rotational body. If the diameter of the shaft is larger than 5 mm, the dynamic torque becomes too large.

As a lubricant, a fluoric oil where the increase of torque at a low temperature is small is used. Particularly, when a fluoric oil which has good temperature-viscosity properties and the kinematic viscosity of which is 20 to 200 cSt at 40° C., is used, and the radial bearing gap between the radial bearing surface and the radial receiving surface is 3.5 to 10 $\mu$m, the appropriate dynamic torque is obtained at a low temperature.

By this feature, it becomes possible to meet a demand of saving the energy of a bearing device. At a low temperature, since the energy for operating a bearing device had to be increased due to an increase of the viscosity of a lubricant with a difference from the viscosity properties of the lubricant at a normal temperature, there was a requirement of the energy which is not required at the normal temperature. In the present invention, it becomes possible to drive a bearing device without using such extra energy.

As for properties of a fluoric oil as a lubricant, when the kinematic viscosity is less than 20 cSt at 40° C., the dynamic torque becomes small but the load capacity becomes insufficient at a high temperature. When the kinematic viscosity is more than 200 cSt at 40° C., the load capacity becomes large but the dynamic torque becomes too large at a low temperature. For exhibiting fully the effect of the present invention, therefore, the use within the range of 20 to 200 cSt at 40° C. is preferable as described above.

When a fluoric oil as a lubricant includes perfluoropolyether having carboxylic acid at its termination which is mixed by 0.1 to 10 wt. %, boundary lubrication properties and leakage properties of the lubricant are further improved.

But, when a fluoric oil includes perfluoropolyether having carboxylic acid at its termination of less than 0.1 wt. %, the boundary lubrication properties and the leakage properties of the lubricant become inferior. When a fluoric oil includes perfluoropolyether having carboxylic acid at its termination of more than 10 wt. %, physical properties of the fluoric oil become inferior and it becomes difficult to obtain the adequate dynamic torque at a low temperature.

When the radial bearing gap between the radial bearing surface and the radial receiving surface is less than 3.5 μm, the dynamic torque becomes large at a low temperature. When the radial bearing gap is more than 10 μm, the dynamic torque becomes small but the load capacity becomes insufficient at a high temperature. For exhibiting fully the effect of the present invention, therefore, the radial bearing gap within the range of 3.5 to 10 m is preferable as described above.

When the radial bearing gap is within the range of 3.5 to 10 μm, there is an effect that the insertion of the shaft to the bearing member becomes easy even in the state of injecting a lubricant into the bearing member and without forming a vent hole in the bearing member.

A cylindrical radial bearing surface disposed in the bearing member is opposite through a radial bearing gap to a radial receiving surface disposed in a shaft. Furthermore, a thrust receiving surface disposed in an end surface of the shaft may be opposite to a thrust bearing surface disposed in the bearing member.

Grooves for generating hydro-dynamic fluid may be formed in at least one of the radial bearing surface and the radial receiving surface of the hydro-dynamic fluid bearing device. The formation of the grooves is not limited to either the radial bearing surface or the radial receiving surface.

When the structure of point contact between a thrust receiving surface and a thrust bearing surface is employed, the contact area can be considerably decreased so it can be attempted to decrease the dynamic torque. When the thrust receiving surface and the thrust bearing surface are opposite to each other through a lubricant, it is expected to improve boundary lubrication properties and it becomes possible to decrease the abrasion between the contact surfaces. Particularly, when a convex spherical surface is formed in the thrust bearing surface, the process that a steel ball constituting a thrust bearing is tightly inserted to a bearing member can be omitted. It is thus attempted to improve the workability of assembling.

A bearing member having a radial bearing surface and a thrust bearing surface may be integrally formed of synthetic resin. Otherwise, differently from the integral formation, a bearing member having a radial receiving surface may be made of copper group metal such as free-cutting brass and phosphorus bronze, and a thrust receiving member having a thrust bearing surface may be formed of a plate made of wear resisting metal or ceramics. The thrust receiving member is mounted to the bearing member. By employing this structure, it is possible to maintain the strength of the flexural rigidity of the bearing device, and to restrain the phenomenon of generating the abrasion of the thrust receiving member.

As the above, for obtaining the high rigidity, the little abrasion and the good durability at the high speed operation in a hydro-dynamic fluid bearing device, in the first aspect, there was described means for restraining shaft run-out or the like by a combination of a reinforcing member to a bearing member mainly made of resin material. In the second aspect, there was described means for restraining shaft run-out or the like by a combination of the shape and a lubricant to a bearing member made of resin material or others.

These aspects were separately described for simplifying the description since they are effective when separately used. The combination of them, however, bring on the more remarkable effect.

Next, as for a bearing member particularly made of resin material and used in the above first and second aspects, a hydro-dynamic fluid bearing member effective to the above aspects will be described as the third aspect. Like the above first and second aspects, the third aspect will be separately described for simplifying the description. It is needless to say that even only the third aspect is effective to the objects of the present invention.

A hydro-dynamic fluid bearing device according to the third aspect of the present invention is made by paying attention to various problems of conventional bearing devices and its object is to provide a hydro-dynamic fluid bearing of good durability, simple process, the small number of parts and low cost.

For attaining the above object, the present invention is a hydro-dynamic fluid bearing characterized in that a cylindrical portion having grooves for generating hydro-dynamic fluid in its inner surface, and a bottom portion integrally with the cylindrical portion are formed into one body by injection molding with resin material, the nearly central portion of the outer surface of the bottom portion is the portion that the resin material lastly flowed in, the inside diameter of the cylindrical portion is 2 to 5 mm, the thickness of the cylindrical portion is 0.8 to 2 mm, and at injection molding, the grooves for generating hydro-dynamic fluid was separated by forced drawing from a core pin which formed the grooves for generating hydro-dynamic fluid.

When the inside diameter of the cylindrical portion is less than 2 mm, the load capacity of the bearing becomes small not to be suited for the use as a hydro-dynamic fluid bearing. When the inside diameter is more than 5 mm, it becomes difficult to maintain the accuracy of the inside diameter surface of the cylindrical portion. The inside diameter of the cylindrical portion is thus adequate within the range of 2 to 5 mm. As for the thickness of the cylindrical portion, when the thickness of the resin is less than 0.8 mm, pressure inclination is generated in the axial direction (the longitudinal direction) at the time of injecting the resin so that the inside diameter surface is formed in a taper shape. When the thickness is more than 2.0 mm, the influence of sink marks and orientation properties of the resin is considerable so that the roundness and the generant shape become bad. The thickness of the cylindrical portion is thus adequate within the range of 0.8 to 2 mm.

It is desirable that the resin material includes polyphenylene sulfide resin, carbon fibers and one or more fillers other than the carbon fibers, the total content of the fillers including the carbon fibers is 20 to 50 wt. %, and the melt index of the resin material is 4 to 9 g/min. at the temperature of 300° C. and the load of 5 kg. Instances of other fillers than the carbon fibers are graphite, molybdenum disulfide, fluororesin, spherical silica and phenolic resin.

The nearly central portion of the outer surface of the bottom portion is the portion that the resin material lastly flowed in a mold at injection molding. At injection molding, the grooves for generating hydro-dynamic fluid was separated by forced drawing from a core pin which formed the grooves for generating hydro-dynamic fluid. Thus, no weld mark is generated and the mold structure becomes simple.

By selecting the above dimensions of the hydro-dynamic fluid bearing, the processing becomes easy and the number of parts can be decreased so the hydro-dynamic fluid bearing can be manufactured at low cost.

The hydro-dynamic fluid bearing uses resin which is superior in slidability and wear resistance. The hydro-dynamic fluid bearing is superior in durability since it is strong to impacts when touching the shaft at times of start and stop.

The hydro-dynamic fluid bearing is manufactured by injection molding. As molding material for the hydro-dynamic fluid bearing, one or more fillers in addition to carbon fibers are filled to polyphenylene sulfide resin. The total content of the fillers including the carbon fibers is 20 to 50 wt. %. When the total content is less than 20 wt. %, mold shrinkage becomes large so that the accuracy can not be insured. Further, the strength can not also be insured. When the total content is more than 50 wt. %, flowability becomes bad so that the accuracy can not be insured.

The melt index is 4 to 9 g/min. (measured at the temperature of 300° C. and the load of 5 kg). When the melt index is less than 4 g/min., the flow becomes bad so the necessary accuracy can not be obtained. When the melt index is more than 9 g/min., mold shrinkage becomes large so the necessary accuracy can not be obtained. By selecting the above wt. % of the fillers, it becomes possible to manufacture a hydro-dynamic fluid bearing in high accuracy.

DETAILED DESCRIPTION OF THE PREFERRED EMBODIMENTS

Figure 1:
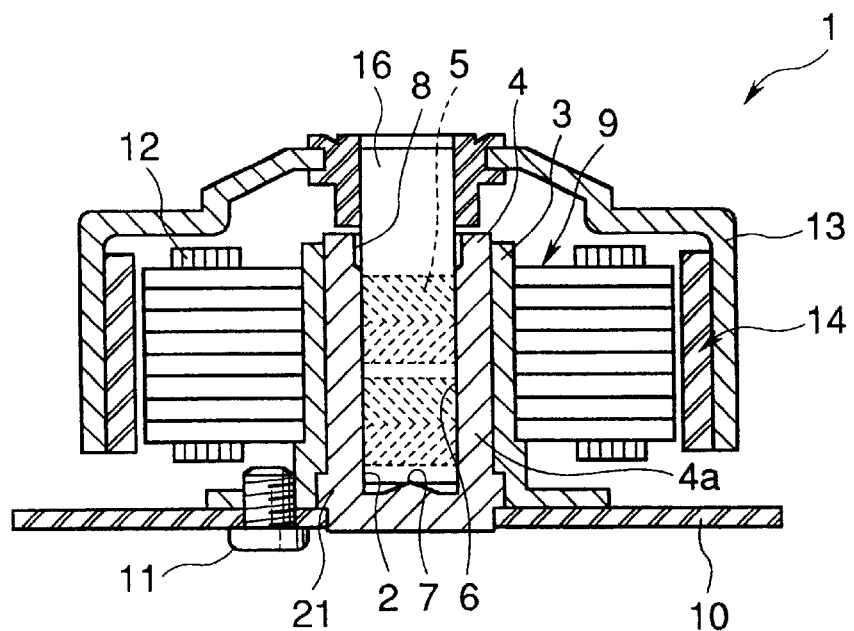
FIG. 1 is a cross-sectional view of the first embodiment of the present invention.

Hereinafter, embodiments of the present invention will be described with reference to drawings. FIG. 1 shows a cross-sectional view of a motor 1 including a hydro-dynamic fluid bearing device of the first embodiment of the present invention.

In the motor 1 of this embodiment, a bearing member 4 made of resin is integrally formed so as to have a cylindrical radial bearing surface 6 provided with grooves 5 for generating hydro-dynamic fluid in a cylindrical hole 2, and a thrust bearing surface 7 which is connected to the radial bearing surface 6. The radial bearing surface 6 is a hydro-dynamic fluid bearing surface and the thrust bearing surface 7 is a sliding bearing surface. A lubricant is disposed in the cylindrical hole 2 as a lubricant fluid. The outer circumferential surface of the bearing member 4 is fixed by adhesion to a metal housing 3 which is an annular member. A shaft 16 is inserted in the bearing member 4 so as to be rotatable. A stator 9 is fixed to the outer circumferential surface of the metal housing 3. The metal housing 3 is fixed to a base (or a print circuit board) 10 with a screw 11. The stator 9 has coils 12. A rotor 14 is disposed outside in the radial direction of the stator 9 so as to be opposite to the stator 9. The rotor 14 is fixed to the shaft 16 through a yoke 13. The rotor 14 and the stator 9 constitute a drive mechanism of the motor 1 including the hydro-dynamic fluid bearing device.

In the hydro-dynamic fluid bearing device constructed as described above, since the bearing member 4 is fixed by adhesion to the metal housing 3 which has the higher rigidity than the bearing member 4, so as to reinforce the cylindrical portion 4a of the bearing member 4, the bending displacement (bending elastic deformation) of the bearing member 4 does not occur even if there is the large unbalance load in the rotor 14 and the large centrifugal force (radial load) attending the rotation of the rotor (shaft) acts upon the bearing member 4.

The outer circumferential surface of the bearing member 4 may be fixed by adhesion to the metal housing 3 either through the entirety in the axial direction of the bearing member 4 or only through the upper portion of the bearing member 4. In the case of the fixture only by adhesion at the upper portion, because a small flange 21 which is formed at a level near the bottom of the bearing member 4 is fixed to the housing 3 by the manner that both side surfaces in the axial direction of the flange 21 is pressed in the axial direction of the bearing member 4 by fastening the housing 3 to the base 10 with the screw 11, the outer circumferential surface of the bearing member 4 is fixed to the housing 3 at two portions of its upper and lower portions to obtain the sufficient reinforcement for the bending displacement of the bearing member 4.

Although the bearing member 4 made of resin is inferior in flexural rigidity to metal, the friction is low and the wear resistance is good and it can be manufactured at low cost by injection molding. It becomes possible to provide a hydro-dynamic fluid bearing device of high rigidity, low friction, good durability and low cost by compensating the lack of the flexural rigidity of the cylindrical portion 4a of the bearing member 4. The radial load and the thrust load can be born by one bearing member 4 having the thrust bearing surface 7 which is a convex spherical surface and the radial bearing surface 6.

Figure 2:
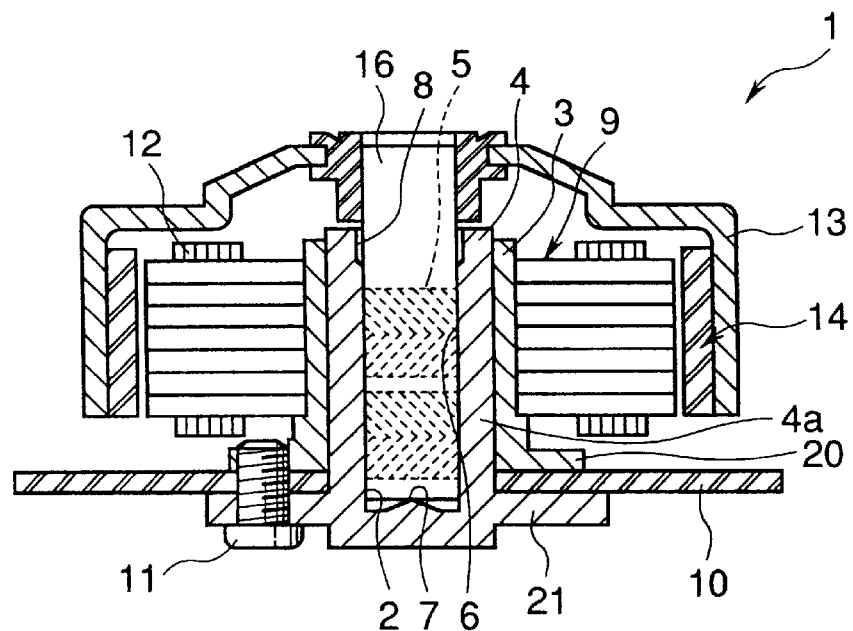
FIG. 2 is a cross-sectional view of the second embodiment of the present invention.

FIG. 2 shows the second embodiment.

Features different from the first embodiment are that the flange 21 of the bearing member 4 made of resin is larger in the radial direction than that of the first embodiment, and the base 10 is sandwiched by the upper surface of the flange 21 of the bearing member 4 and the lower surface of a flange 20 of the housing 3, and the base 10 and the bearing member 4 are fixed to the housing 3 with the screw 11. The bearing member 4 may be fixed by adhesion to the annular metal housing 3 either through the entirety in the axial direction of the outer circumferential surface of the bearing member 4 or only through the upper portion of the outer circumferential surface of the bearing member 4, like the first embodiment. When the screw 11 is disposed so as not to protrude in the axial direction from the bearing member 4, there is an advantage that a thin bearing device can be obtained without changing the length of the bearing member 4.

Other operations and effects are similar to those of the first embodiment.

Figure 3:
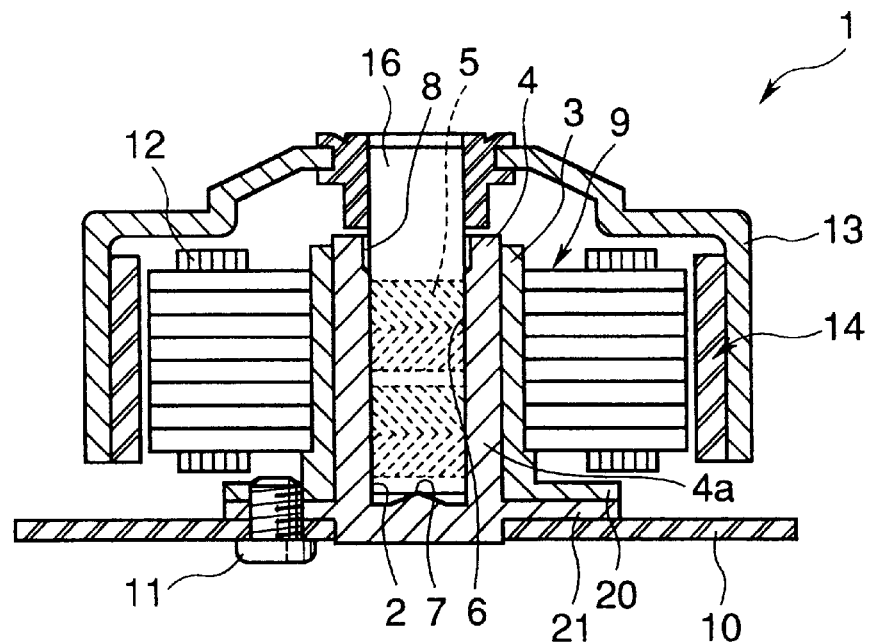
FIG. 3 is a cross-sectional view of the third embodiment of the present invention.

FIG. 3 shows the third embodiment.

Features different from the first embodiment are that the flange 21 of the bearing member 4 is sandwiched by the base 10 and the flange 20 of the housing 3, and the base 10 and the bearing member 4 are fixed to the housing 3 with the screw 11. The number of steps for processing the housing 3 is smaller than that of the first embodiment and the thickness accuracy of the flange 21 of the bearing member 4 is not required. Because the flange 21 of the bearing member 4 is directly fixed to the housing 3, the strength of the fixture with the screw is higher than that of the second embodiment.

Other operations and effects are similar to those of the first embodiment.

Figure 4:
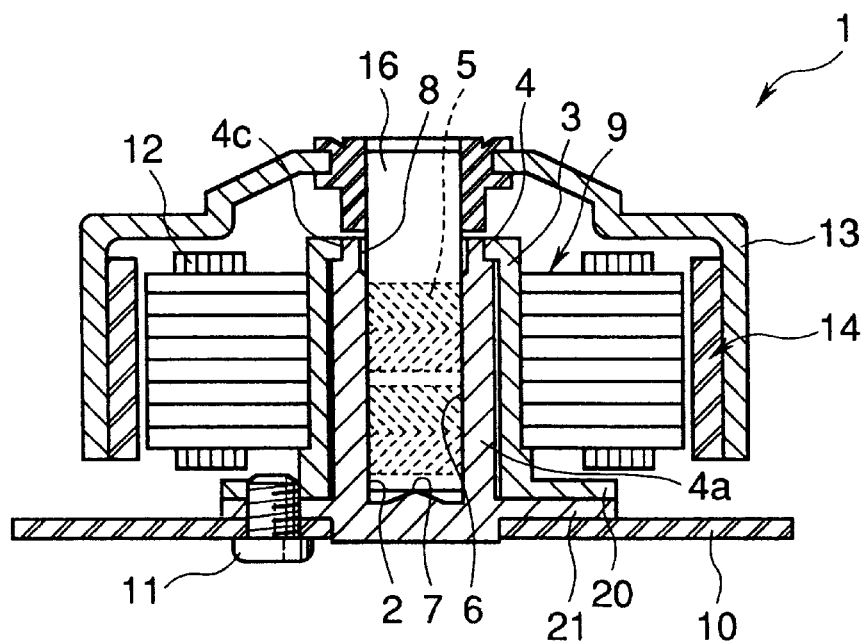
FIG. 4 is a cross-sectional view of the fourth embodiment of the present invention.

FIG. 4 shows the fourth embodiment.

Features different from the third embodiment are that the diameter of the outer circumferential surface of the bearing member 4 is smaller at a portion 4c near a cylindrical opening than at the other portion, and the portion 4c is fixed to the annular housing 3 by adhesion or firm insertion.

Generally, when the outside diameter surface of the bearing member 4 made of resin is firmly inserted, the interference of the outside diameter affects the shrinking quantity of the inside diameter. The shrinking quantity of the inside diameter is 80 to 100% of the interference of the outside diameter though it varies in accordance with the ratio of the inside diameter to the outside diameter (d/D) and the quality of the material. It is thus impossible to insure the accuracy of the inside diameter of the bearing member 4 made of resin which is required for a hydro-dynamic fluid bearing. Accordingly, in this embodiment, the metal housing 3 is in contact with the portion 4c near the opening which is an outside diameter portion corresponding to a lubricant reservoir 8 (the inside diameter of the lubricant reservoir 8 is larger than that of the other portion of the cylindrical hole 2 to insure the quantity of a lubricant enough for improving the durability). Thus, the radial bearing surface 6 is not affected. In the bearing member 4, since the portion for firm insertion is thinner than the other portion, the affection of the pressure in the axial direction can be decreased. Thus, the bearing member 4 can be fixed to the housing 3 by firm insertion without decreasing the required accuracy of the radial bearing surface 6.

Since the accuracy of the outside diameter of the bearing member 4 is required merely at the portion 4c (small diameter portion) near the opening for firm insertion, the processing of the bearing member 4 is easy.

Other operations and effects are similar to those of the third embodiment.

Figure 5:
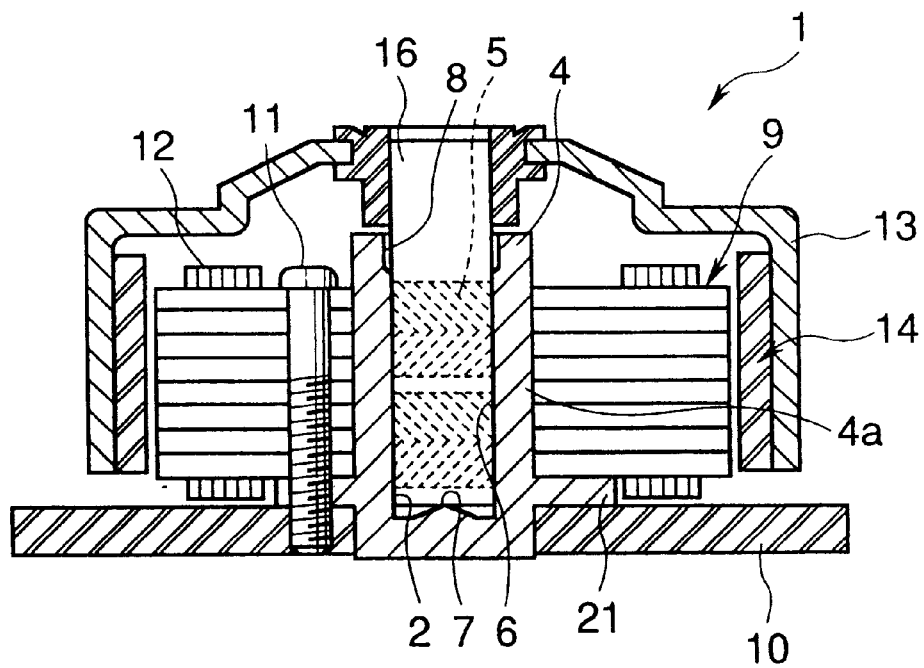
FIG. 5 is a cross-sectional view of the fifth embodiment of the present invention.

FIG. 5 shows the fifth embodiment.

Figure 6:
FIG. 6 is an illustrative view of a stator a part of which is cut out.

Features different from the third embodiment are that there is no housing and the bearing member 4 made of resin is directly fixed to the inner circumferential surface of the stator 9 which is an annular member as shown in FIG. 6. The flange 21 of the lower portion of the bearing member 4 is sandwiched and pressed by the stator 9 and the base 10 and is fixed to the stator 9 and the base 10 with a screw 11. The upper portion and the middle portion of the bearing member 4 are directly fixed to the stator 9 by adhesion. There are advantages that the number of parts is decreased and assembling becomes easy.

Other operations and effects are similar to those of the third embodiment. The stator 9 which constitutes the drive mechanism of the motor 1 including the hydro-dynamic fluid bearing device, is an annular member made of steel. The rigidity of it is larger than that of the bearing member 4 made of resin. The inner circumferential surface of the stator 9 is annular.

Figure 7:
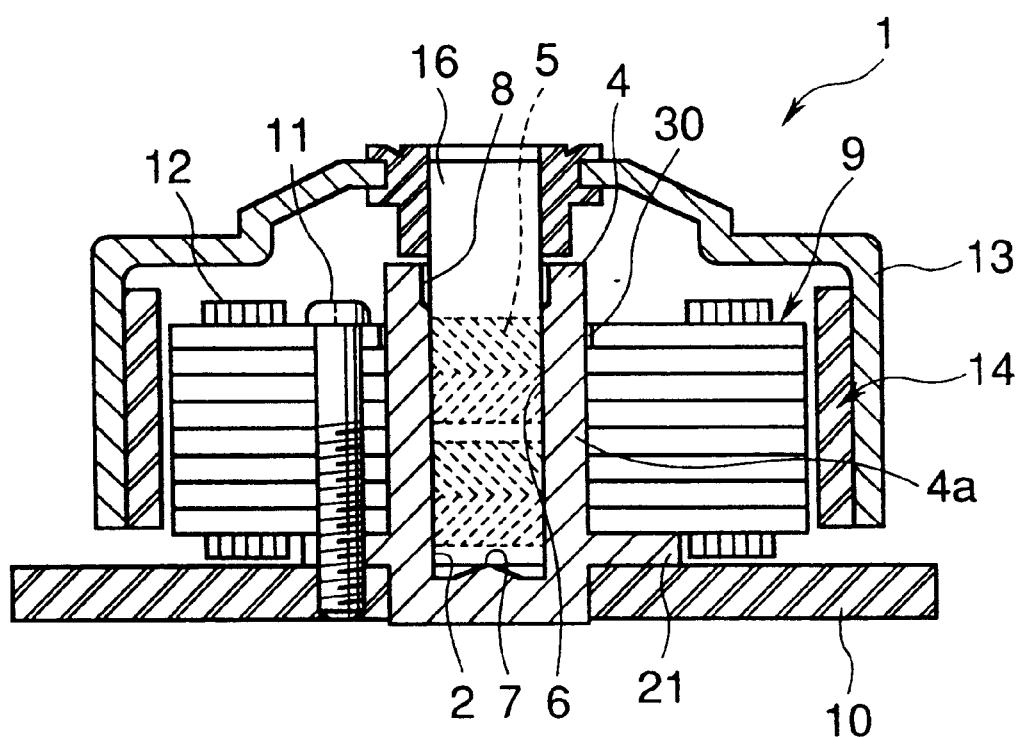
FIG. 7 is a cross-sectional view of the sixth embodiment of the present invention.

FIG. 7 shows the sixth embodiment.

Features different from the fifth embodiment are that a filler 30 is disposed in a gap between the upper portion of the outer circumferential surface of the bearing member 4 and the inner circumferential surface of the stator 9 so as to fix the stator 9 and the bearing member 4 to each other. Although the bearing member 4 and the stator 9 are not fixed to each other by adhesion, the bearing member 4 can be sufficiently reinforced by filling the gap between the bearing member 4 and the stator 9 with the filler 30.

Other operations and effects are similar to those of the fifth embodiment.

This embodiment is not restrictive, and the bearing member 4 may be reinforced by the manner that two portions of both end portions in the axial direction of the outer circumferential surface of the bearing member 4 are fixed to an annular member the rigidity of which is larger than that of the bearing member 4.

The present invention may be a combination in which some of the first to sixth embodiments are combined in an ordinary manner. The outer circumferential surface of the bearing member 4 may be reinforced by the manner that it is mounted to the rotor 14 which is an annular member made of steel and constitutes the drive mechanism of the motor including the hydro-dynamic fluid bearing device. The rigidity of the rotor 14 is larger than that of the bearing member 4 made of resin. In that case, the bearing member 4 rotates.

The bearing member 4 in which the radial bearing surface 6 having grooves 5 for generating hydro-dynamic fluid requires a high accuracy is manufactured by injection molding. If the flange 21 extending outwards in the radial direction from the outer circumferential surface of the bearing member 4 is positioned at the same level of the portion 4c near the opening of the cylindrical hole 2 or the middle portion in the axial direction, the inner circumferential surface of the cylindrical hole 2 can not be accurately formed due to sink marks by the influence of the difference of the thickness in the radial direction of the bearing member 4. Therefore, the flange 21 is formed at the level near the bottom portion of the bearing member 4. The influence of the difference of the thickness of the bearing member 4 which the inner circumferential surface of the cylindrical hole 2 receives is thus decreased so the inner circumferential surface of the cylindrical hole 2 is accurately formed. The rigidity of the bearing member 4 increases by the manner that the bearing member 4 is fixed to the annular member. The bearing member 4 is not provided with the flange 21.

Figure 8:
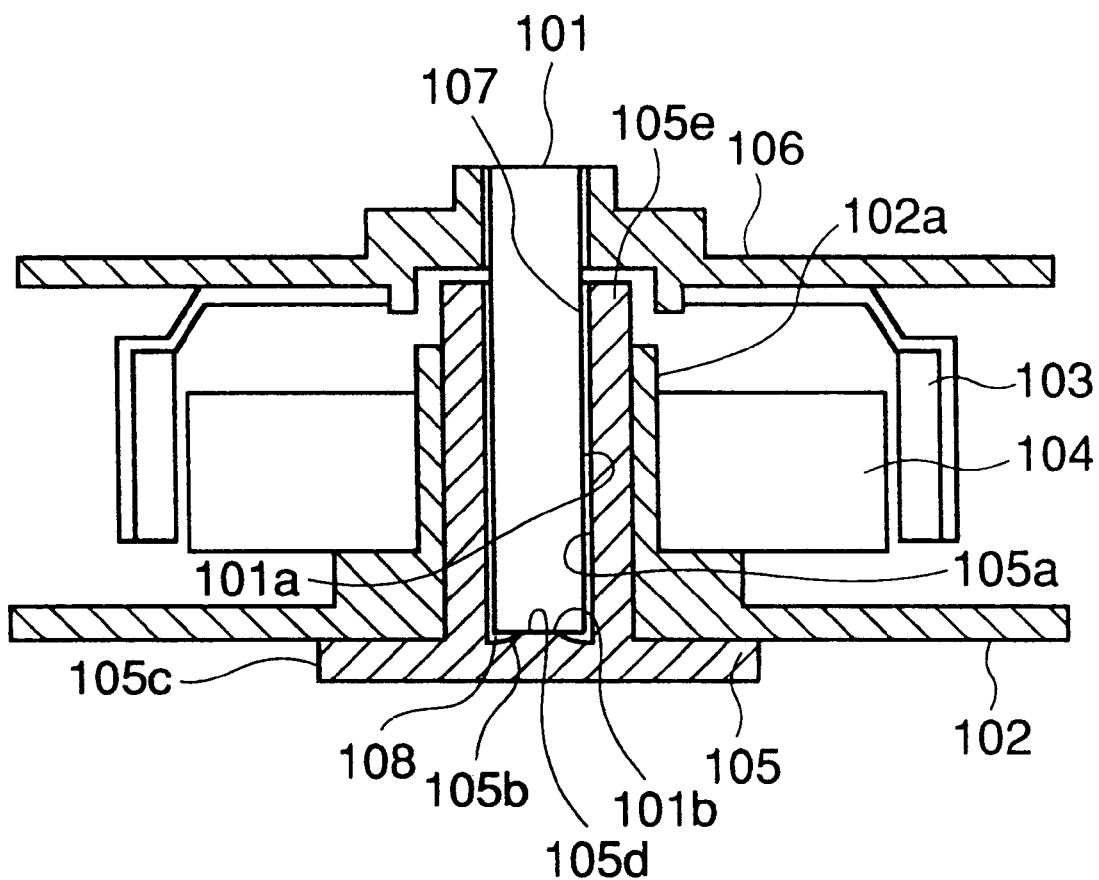
FIG. 8 is a cross-sectional view of the seventh embodiment of the present invention.

Next, FIG. 8 shows a cross-sectional view of a bearing device according to the seventh embodiment of the present invention. A rotational member includes a shaft 101, a disk attachment flange 106 and a rotor 103. A supporting member for supporting the rotational member includes a stator 104, a base 102 and a bearing member 105.

Figure 12:
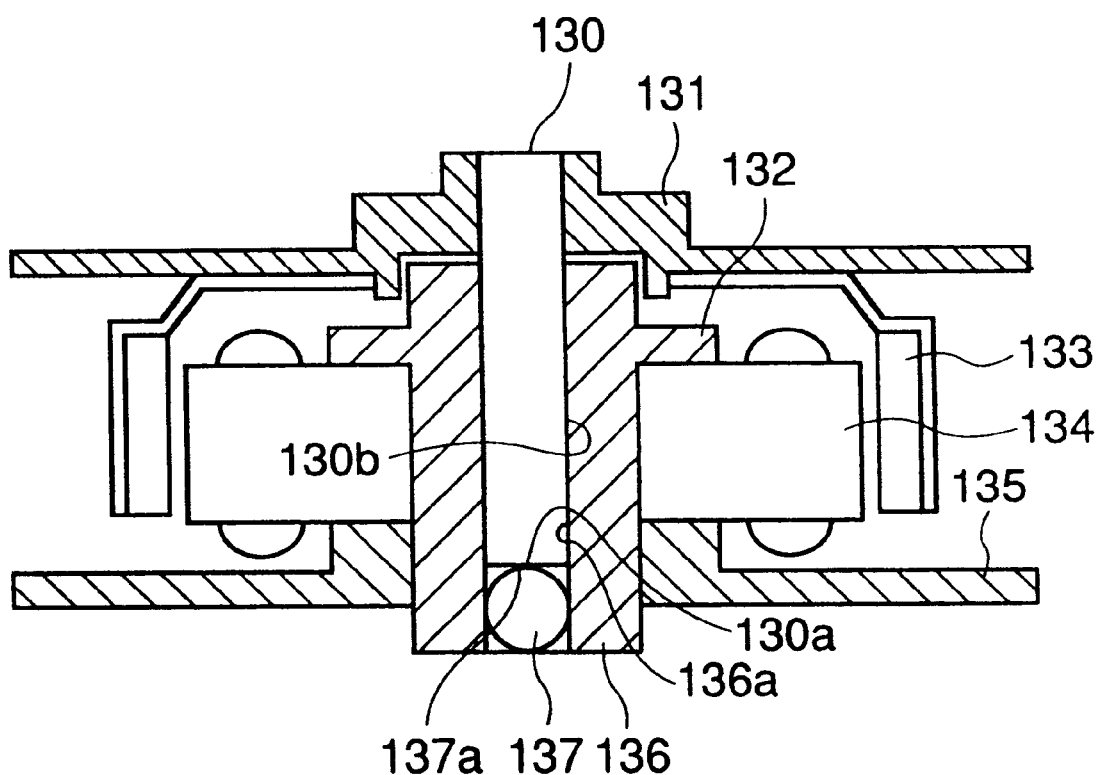
FIG. 12 is a cross-sectional view of an instance of a prior art bearing device.
Figure 13:
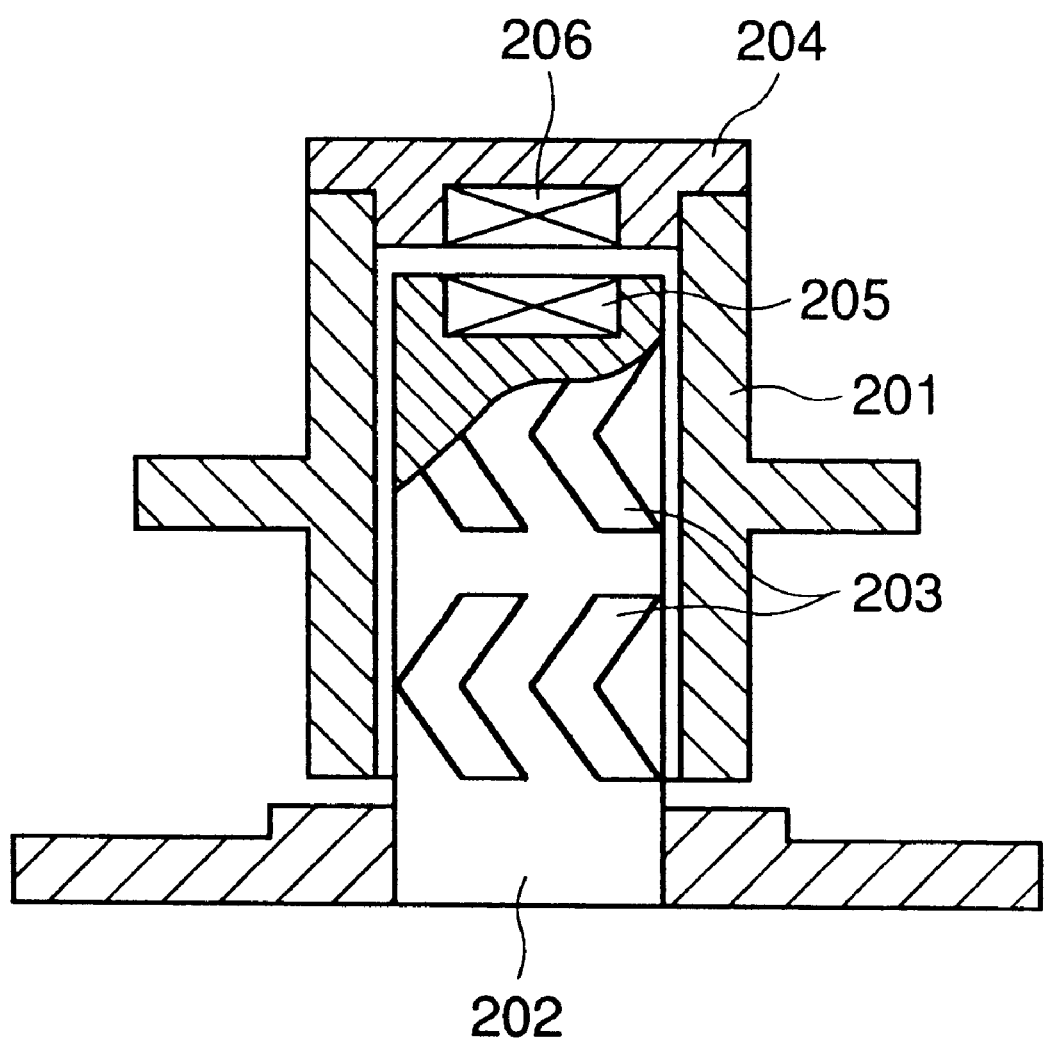
FIG. 13 is a cross-sectional view of another instance of a prior art bearing device.

Because the fundamental structure of the rotational member is the same as that of the prior art bearing device shown in FIG. 12, the description will be omitted. As the quality of the material for the shaft 101 in the bearing device according to this embodiment, a stainless steel of SUS 440C treated by heat which is generally used is employed. But the quality of the material for the shaft 101 used in a bearing device of the present invention is not limited if the condition of the diameter of 2 to 5 mm of the shaft which is a necessary condition of the present invention is satisfied.

The fundamental structure of the supporting member for supporting the rotational member is also the same as that of the prior art bearing device shown in FIG. 12. But, since the shape and so on of the bearing member differ from those of the prior art bearing device, those points will be mainly described.

In the bearing device of the present invention, a flange 105c of the bearing member 105 is disposed below a cylindrical portion of the bearing member 105. Thus, in the bearing member, the positions in the axial direction of the portion of the grooves for generating hydro-dynamic fluid and the flange are different from each other. By this structure, at the injection molding of the bearing member of resin, it is prevented to decrease the accuracy of the portion of the grooves for generating hydro-dynamic fluid due to an influence of the flange 105c.

In the prior art bearing device, the thrust bearing surface of the thrust bearing is formed by the manner that a steel ball which is the thrust receiving member is tightly inserted in the bearing member. But, in the present invention, the bearing member 105 is provided with the thrust bearing surface, the central portion of which is a convex spherical surface 105d.

By this structure, the convex portion can be formed in the bearing device at the same time as the injection molding of the bearing member of resin. Thus, the process of inserting tightly the steel ball for the thrust receiving member in the bearing member can be omitted so it becomes possible to improve the workability of assembling.

A base 102 made of metal such as aluminum die cast and zinc die cast is used. As shown in FIG. 8, the cylindrical portion 105e of the bearing member 105 is fixed on a cylindrical portion 102a of the base 102. The flexural rigidity of the bearing member 105 made of synthetic resin is thus strengthened. In this case, particularly, since the long cylindrical portion 102a of the base 102 is disposed along the cylindrical portion 105e of the bearing member, the flexural rigidity of the bearing member 105 made of synthetic resin is strengthened.

In the bearing device of the present invention, for strengthening the flexural rigidity of the bearing member of the fluid bearing, it is also possible that the cylindrical portion 105e having the radial bearing surface of the bearing member is made of copper group metal such as free-cutting brass and phosphorus bronze, and a thrust receiving member having a thrust bearing surface is fixed to the bearing member. The thrust receiving member may be a thrust plate made of ceramics or the like. In this structure, the strength of the flexural rigidity of the bearing member 105 can be insured even without a long cylindrical portion 102a of the base 102.

When an adhesive fills up between the cylindrical portion 105e of the bearing member and the cylindrical portion 102a of the base, the flexural rigidity of the bearing member 105 becomes stronger. The supporting member for supporting the rotational member is completed by the manner that a stator 104 is assembled in the cylindrical portion 102a of the base by firm insertion or the like.

Next, the structure of the cylindrical portion 105e of the bearing member will be described. In the inner circumferential surface of the cylindrical portion 105e of the bearing member, radial bearing surfaces 105a are formed at two portions which are distant from each other in the axial direction. Herringbone-shaped grooves for generating hydro-dynamic fluid are formed in each radial bearing surface 105a. A shaft 101 disposed in the bearing member 105 has cylindrical radial receiving surfaces 101a which are opposite to the radial bearing surfaces 105a through a lubricant in a radial bearing gap 107, respectively.

The radial bearing gap 107 is established so as to meet the condition of 3.5 to 10 $\mu$m which is a necessary condition of the present invention. If it is out of the range, the load capacity becomes small or the dynamic torque becomes large.

The lower end surface of the shaft 101 has a thrust receiving surface 101b opposite to a thrust bearing surface 105b through the lubricant. The thrust bearing surface 105b is a convex spherical surface so as to be in a point contact with the thrust receiving surface 101b for decreasing the contact area between them.

A fluoric oil which has the kinematic viscosity of 20 to 200 cSt at 40° C. is disposed as a lubricant between the radial bearing surface 105a and the radial receiving surface 101a and between the thrust bearing surface 101b and the thrust receiving surface 105b.

Next, the operation of the bearing device of the present invention will be described. But since the fundamental operation is the same as that of the prior art bearing device, an outline of the operation will be merely described. When the stator 104 is electrified, a rotating magnetic field is generated. The rotor 103 thereby rotates together with the shaft 101 and the disk attachment flange 106. When the rotational member constituted by the shaft 101, the rotor 103 and so on rotates, the thrust bearing surface 101b rotates in point contact state with the thrust receiving surface 105b through the lubricant.

The thrust bearing surface 101b and the thrust receiving surface 105b constitute a sliding bearing by such point contact. At this time, since the lubricant flows in the thrust bearing gap 108 between the thrust bearing surface 101b and the thrust receiving surface 105b, and they are in point contact with each other through the lubricant, the boundary lubrication properties are improved to decrease the abrasion of the thrust bearing surface 101b and the thrust receiving surface 105b.

While the thrust receiving surface 105b is in point contact with the thrust bearing surface 101b and rotates relatively to the latter, the pressures of the lubricant in the radial bearing gaps 107 between the radial bearing surfaces 105a and the radial receiving surfaces 101a increase because of a pumping effect by the grooves for generating hydro-dynamic fluid, respectively. The radial bearing surfaces 105a rotate in non-contact state with the radial receiving surfaces 101a. Although the rotational operation starts, in the case of the structure of the bearing device of the present invention, the flexural rigidity of the shaft can be insured and it becomes possible to suppress the increase of the torque at a low temperature.

For improving boundary lubrication properties and leakage properties of the lubricant, the fluoric oil includes perfluoropolyether having a carboxylic acid at its termination which is mixed by 0.1 to 10 wt. %.

In the bearing device of the present invention, considering the lack of corrosion resistant properties of fluoric oil, stainless steel is used as the material of the shaft and plastics is used for the bearing member. For improving the slidability at the time of start and stop, PPS (polyphenylene sulfide resin) including carbon fibers and Teflon can be used as the material of the bearing member. In this invention, taking it the other way round, it is also possible to rotate the bearing member 105 which is born by the shaft 101.

Figure 9:
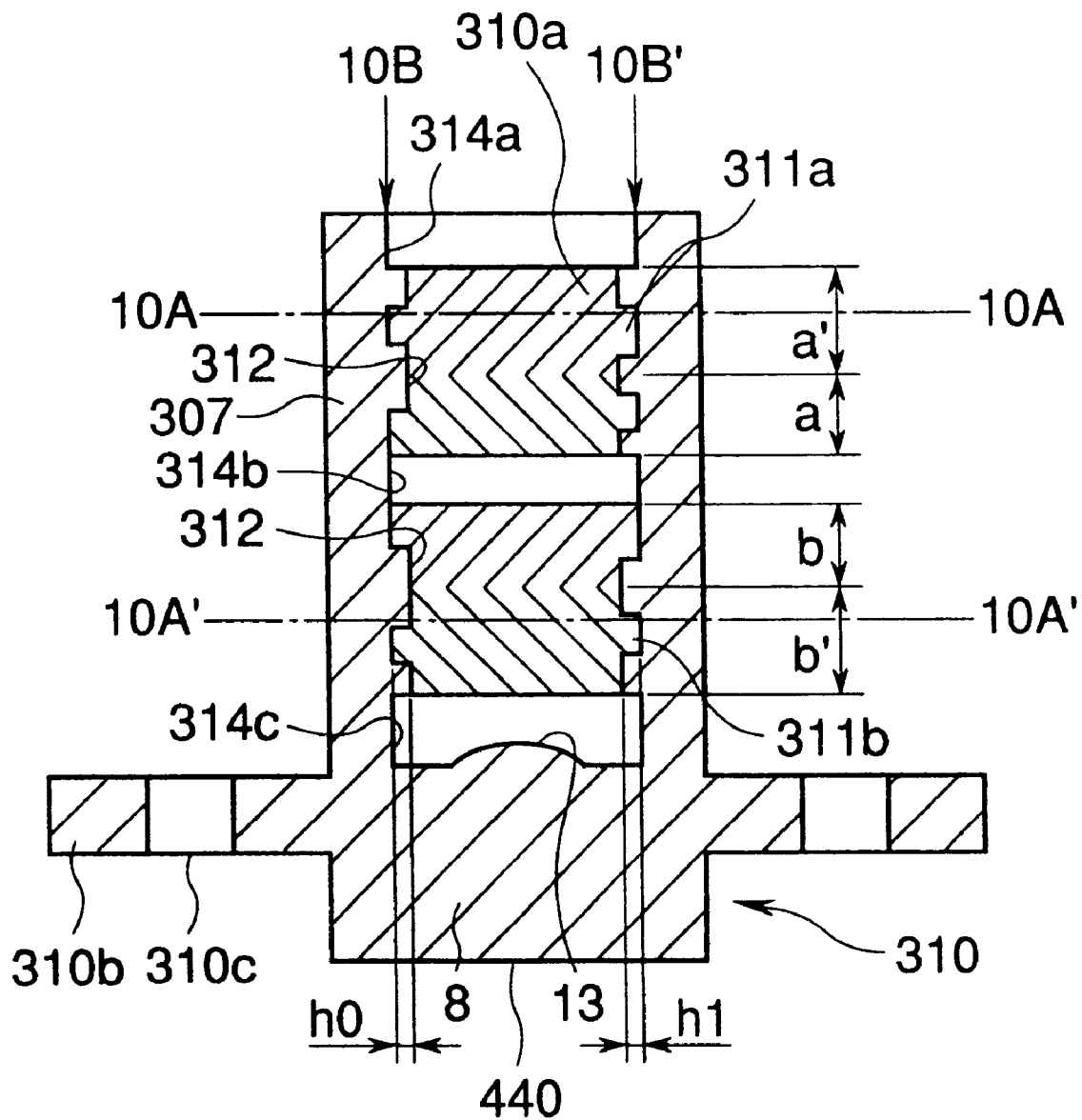
FIG. 9 is a vertically cross-sectional view of the eighth embodiment of the present invention.

The eighth embodiment of the present invention is shown in FIG. 9.

FIG. 9 is a vertically cross-sectional view of a hydro-dynamic fluid bearing member 310 according to the present invention in which the radial bearing and the thrust bearing are integrated with each other.

First, the structure will be described. In the hydro-dynamic fluid bearing member 310, a cylindrical portion 307 and a bottom portion 308 integral with the cylindrical portion 307 are formed into one body of a resin material by injection molding. A cylindrical bearing hole 310a the central axis of which extends in the vertical direction is formed inside of the hydro-dynamic fluid bearing member 310. The upper end of the bearing hole 310a is open to communicate the exterior. The lower end of the bearing hole 310a is closed to form a bottom surface. A flange 310b provided with through holes 310c for bolts which are utilized when a stator and so on are fixed to the hydro-dynamic fluid bearing member 310 is formed integrally with the outer circumferential surface of the bottom portion 308 of the hydro-dynamic fluid bearing member 310.

In the inner circumferential surface of the bearing hole 310a, cylindrical radial bearing surfaces 312 are formed at two portions which are distant from each other in the axial direction. Grooves 311a and 311b for generating hydro-dynamic fluid are formed in the radial bearing surfaces 312, respectively. Thus the cylindrical portion 307 has the grooves 311a and 311b for generating hydro-dynamic fluid in the inner surface. Both ends of the radial bearing surfaces 312 in the radial direction (vertical direction in FIG. 9) are respectively connected to oil reservoirs 314a, 314b and 314c of annular groove shapes which are utilized for improving the durabilities of the radial bearing surfaces 312 by supplying an oil as a lubricant fluid to the radial bearing surfaces 312. These oil reservoirs 314a, 314b and 314c are continuous in the circumferential direction, respectively. The oil reservoirs 314a and 314b communicate with the upper and lower ends of the grooves 311a for generating hydro-dynamic fluid, respectively. The oil reservoirs 314b and 314c communicate with the upper and lower ends of the grooves 311b for generating hydro-dynamic fluid, respectively.

At injection molding, the oil reservoirs 314a, 314b and 314c and the grooves 311a and 311b for generating hydro-dynamic fluid are separated by forced drawing from a core pin which formed them. Thus, the depth h1 of the oil reservoirs 314a, 314b and 314c is nearly equal to the depth h0 of the grooves 311a and 311b.

In the present invention, also the oil reservoirs can be easily formed. For instance, they can be formed in the hydro-dynamic fluid bearing merely by processing protruded portions for forming the oil reservoirs, on the outer circumferential surface of a cylindrical core pin in addition to protruded portions for forming the grooves for generating hydro-dynamic fluid.

At the time of injection molding of resin, the portion near the opening end of the bearing hole 310a and the portion near the flange 310b of the inner circumferential surface of the cylindrical portion 307 are apt to be affected by orientation properties and the rate of solidification in comparison to the other portion of the inner circumferential surface of the cylindrical portion 307. Thus, those portions are apt to be inferior in the molding accuracy to the other portion of the inner circumferential surface of the cylindrical portion 307. Accordingly, by forming the oil reservoirs which are not so required the processing accuracy are formed in such portions as apt to inferior in the molding accuracy, the problems of the processing accuracy can be solved and the quantity of the lubricant enough for improving the durability is insured.

As for dimensions of the hydro-dynamic fluid bearing member 310 according to this embodiment, considering the accuracy and the strength, the inside diameter of the cylindrical portion 307 is 3 mm, the outside diameter is 5.5 mm and the thickness is 1.25 mm. The length in the axial direction of the hydro-dynamic fluid bearing member 310 is 12 mm, and the depth of the bearing hole 310a is 10 mm. The thickness of the flange 310c is 1.5 mm in consideration of the strength at the fixture.

Figure 10A:
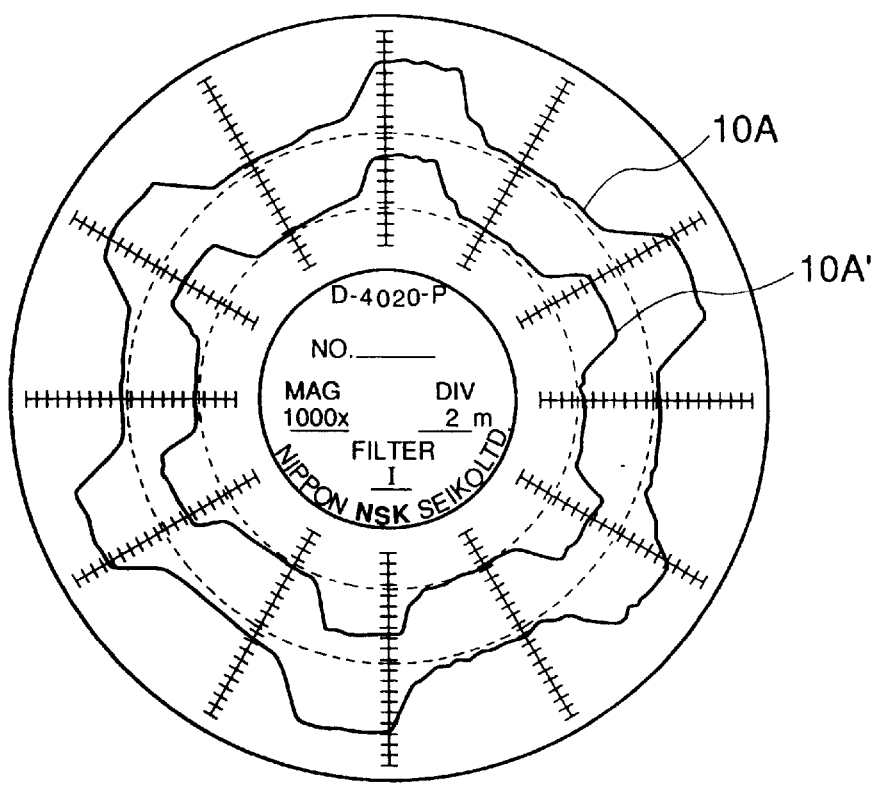
FIG. 10A is measurement data of the roundness in a hydro-dynamic fluid bearing device of the eighth embodiment of the present invention.
Figure 10B:
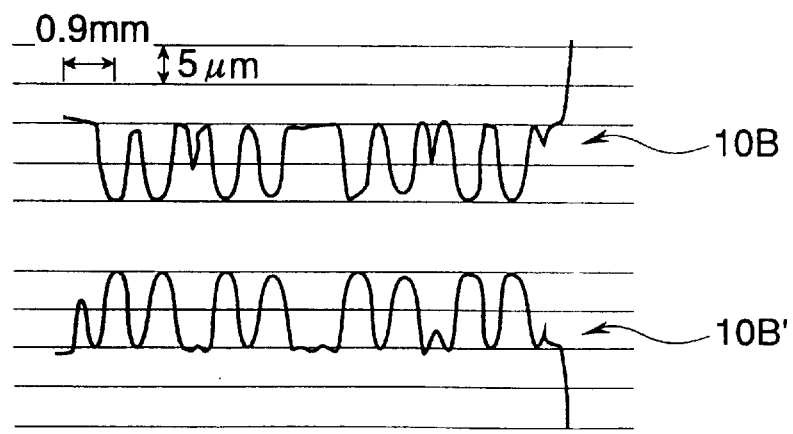
FIG. 10B is measurement data of the processing accuracy in relation to shape.

FIG. 10A shows measurement data of the roundness. In the drawing, 10A represents a measurement result of the roundness where the inside diameter surface of the cross-section of the cylindrical portion of the hydro-dynamic fluid bearing member along a line 10A—10A in FIG. 9 is measured. 10A' represents a measurement result of the roundness where the inside diameter surface of the cross-section of the cylindrical portion of the hydro-dynamic fluid bearing member along a line 10A'—10A' in FIG. 9 is measured. It is realized that the roundness is less than 2 μm in either of 10A and 10A'. FIG. 10B shows results where the shape of the bearing hole of the cylindrical portion of the hydro-dynamic fluid bearing member is measured in the axial direction. In the drawing, 10B and 10B' represent results from points 10B and 10B' in FIG. 9, respectively, where the shape of the inside diameter surface is measured in the axial direction from the bottom portion to the opening end along the inside diameter surface of the bearing hole. The depth of the grooves for generating hydro-dynamic fluid and the depth of the oil reservoirs are 9 to 11 μm and the accuracy of the depth is less than 2 μm. The accuracy of the shape is less than 2 μm throughout the inside diameter surface. As realized from the above results, as for either of the roundness and the shape, the hydro-dynamic fluid bearing according to the present invention satisfies enough the necessary accuracy for hydro-dynamic fluid bearing.

When the inside diameter of the cylindrical portion 307 is 2 to 5 mm and the thickness of the cylindrical portion 307 is 0.8 to 2.0 mm, a nearly equal accuracy could be obtained.

Since the hydro-dynamic fluid bearing is superior in the slidability and the durability, it is possible to reduce impacts and damages when touching the shaft at the time of start and stop. The wear resistance of the bottom portion which is especially apt to suffer abrasion is superior.

In the case of forming two herringbone patterns of grooves as a groove pattern formed in the cylindrical portion 307 constituting the radial hydro-dynamic fluid bearing as the embodiment, non-symmetric grooves may be formed so that the widths a' and b' in the axial direction outside of bending portions are larger than the widths a and b in the axial direction inside of the bending portions, respectively. By pumping effects of such non-symmetric grooves, even if the dimensional accuracy or the shape of the inner surface of the cylindrical portion is slightly bad, the flow of a lubricant fluid is forcedly introduced to the middle portion of the hydro-dynamic fluid bearing. Thus, the lubricant fluid is prevented from leaking out of the hydro-dynamic fluid bearing so it is desirable for insuring the durability. The groove pattern is not limited to the embodiment. It may be one herringbone pattern. A pattern or patterns other than the herringbone pattern may be used. Since the groove pattern can be determined merely in accordance with the pattern of protrusions for forming grooves for generating hydro-dynamic fluid, which is processed in a core pin of a mold for forming the bearing hole 310a, any pattern can be easily manufactured.

In the bottom portion 308 constituting the thrust bearing portion, the central portion of the thrust bearing surface 313 of the bottom surface of the bearing hole 310a is formed into a convex spherical surface. Since it is in point contact with the end surface of the shaft inserted in the bearing hole 310a, the friction torque at a rotation is kept from increasing. In the case of a large axial load, grooves for generating hydro-dynamic fluid may be formed in the thrust bearing surface 313 so as to generate a lifting force by a hydro-dynamic fluid effect attending on rotation. The abrasion of the thrust bearing surface is thereby reduced. A protrusion having a flat surface at the top may be formed in the thrust bearing surface 313 in place of the convex spherical surface. It is also possible that the thrust bearing surface 313 is flat and the end surface of the shaft opposite to the thrust bearing surface 313 is spherical. After all, the thrust bearing surface 313 can have any shape if the friction is low when rotating and the partial contact with the shaft can be avoided. Similarly in the case of manufacturing the groove pattern of grooves for generating hydro-dynamic fluid or the oil reservoirs, since the shape of the thrust bearing surface 313 can be selected merely by processing an end surface of a core pin of a mold for forming the bearing hole 310a, any shape can be easily manufactured.

Figure 11:
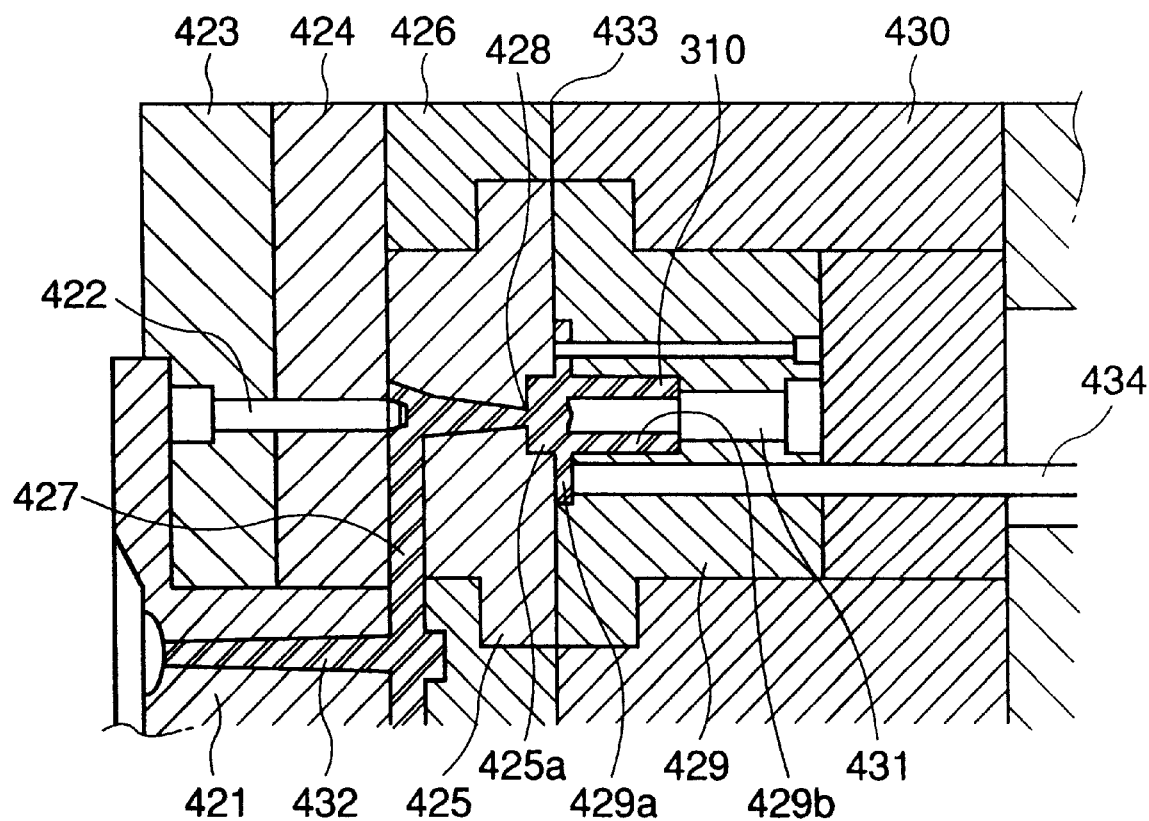
FIG. 11 is a vertically cross-sectional view of the principal part of an instance of a mold for injection molding for a hydro-dynamic fluid bearing device of the present invention.

FIG. 11 shows an instance of a mold for injection molding for a manufacturing method of a hydro-dynamic fluid bearing of the present invention (a vertically cross-sectional view of the principal part).

The mold is a three-plates mold. The fixed side comprises a spoor bush 421, a fixed side attachment plate 423 to which a runner lock pin 422 is attached, a runner stripper plate 424, a fixed side mold plate 426 having a fixed side cavity 425, and so on. The fixed side cavity 425 is provided with a runner 427, a gate 428 and a recessed portion 425a for forming a bottom portion of a hydro-dynamic fluid bearing.

The movable side comprises a movable side mold plate 430 having a movable side cavity 429, and so on. The movable side cavity 429 is provided with recessed portions 429a and 429b for forming a flange and a cylindrical portion of a hydro-dynamic fluid bearing, respectively. Further, there is provided a core pin 431 for forming a radial bearing surface, which has grooves for generating hydro-dynamic fluid, of a cylindrical portion of a hydro-dynamic fluid bearing, and a thrust bearing surface 313, which is connected to the radial bearing surface, of a bottom portion of the hydro-dynamic fluid bearing.

The other parts of the movable side (a guide pin, a support pin, a spacer block, a movable side attachment plate, an ejector plate to which an ejector pin is attached, a return pin, a spring and so on) and a tension link for operating the three plates, a plug bolt, a stop bolt, a heater for controlling the temperature of the mold, and so on are omitted in the drawing.

When a hydro-dynamic fluid bearing is formed by injection molding using the above mold, molten resin injected from an injection nozzle of an injection molding machine into the mold flows through a spoor 432 and the runner 427 and flows into the recessed portion 425a, which is formed in the fixed side cavity 425, for forming a bottom portion of the hydro-dynamic fluid bearing, from the one point pinpoint gate 428 provided nearly at the center of the recessed portion 425a. The resin flowing into the recessed portion 425a is filled in the recessed portion 425a. The resin is then filled in the recessed portion 429a of the movable side cavity 429 uniformly in the circumferential direction of the recessed portion 429a. After this, the resin is filled in the recessed portion 429b. Since the resin is filled from the one point pinpoint gate 428 nearly at the center of the recessed portion 425a, when filling in the recessed portion 429b for forming a cylindrical portion of the hydro-dynamic fluid bearing, the leading portion of the molten resin flows to the axial direction of the recessed portion 429b uniformly in the circumferential direction. Thus, no weld mark is generated and the injection pressure is applied uniformly. The nearly central portion 440 of the outer surface of the bottom portion of the hydro-dynamic fluid bearing is the portion that the resin material lastly flows in the mold at the injection molding. Thus, a mark of gate remains. Since there is used the material for molding in which carbon fibers and one or more fillers other than the carbon fibers are filled to polyphenylene sulfide resin, the total content of the fillers is 20 to 50 wt. %, and the melt index of the material is 4 to 9 g/min. (measured at the resin temperature of 300° C. and the load of 5 kg), high accuracies (the roundness, the generant shape, the cylindrical degree, and the dimensional accuracy) can be obtained.

After keeping pressure and cooling, by the separation of the mold of the molding machine, the mold is opened between the fixed side mold plate 426 and the runner stripper plate 424. The portion of the gate 28 is cut so that a hydro-dynamic fluid bearing (product) remains in the fixed side cavity 429, and a spoor and a runner remain on the runner stripper plate 424. Next, the mold is opened between a PL (parting line) 433 and the runner stripper plate 424 and between the runner stripper plate 424 and the fixed side attachment plate 423. The separation of the hydro-dynamic fluid bearing from the movable side cavity 429 is performed by the manner that the flange surface is pushed out by the ejector pin 434. Thus, grooves for generating hydro-dynamic fluid are separated from the core pin 431 which formed the grooves for generating hydro-dynamic fluid, by forced drawing by utilizing the elastic deformation of resin. Since the grooves for generating hydro-dynamic fluid are separated from the core pin to the axial direction by forced drawing, the structure of the mold can be simplified. Since the shape and the pattern of the grooves for generating hydro-dynamic fluid can be determined merely by processing the corresponding shape and pattern to the core pin, the freedom of the design of the grooves for generating hydro-dynamic fluid increases.

The position for pushing out a hydro-dynamic fluid bearing is not limited to this embodiment. The end surface around the opening of the hydro-dynamic fluid bearing may be pushed out by an ejector pin or a sleeve.

What is claimed is:

1. A hydro-dynamic fluid bearing device comprising a cylindrical shaft, a substantially cylindrical bearing member for axially supporting the shaft rotatably in a cylindrical hole having a bottom surface, a supporting member fixed on one side of the shaft and the bearing member, and a rotation member fixed on the other side of the shaft and the bearing member and rotatably supported on the supporting member, grooves for generating hydro-dynamic fluid being formed on at least one of the outer peripheral surface of the shaft and the inner peripheral surface of the cylindrical hole of the bearing member, wherein the diameter of the shaft is in the range of 2 to 5 mm, and a space between the shaft and the cylindrical hole of the bearing member is in the range of 3.5 to 10 μm, and a lubricant held therebetween is a fluoric lubricant having a kinematic viscosity of 20 to 200 cSt (40° C.).

2. A hydro-dynamic fluid bearing device according to claim 1, wherein one of a thrust bearing surface of a bottom of said cylindrical hole and an end portion of said shaft facing said thrust bearing surface includes a protrusion.

3. A hydro-dynamic fluid bearing device according to claim 2, wherein said protrusion has a flat end surface.

4. A hydro-dynamic fluid bearing device according to claim 1, wherein one of a thrust bearing surface of a bottom of said cylindrical hole and an end portion of said shaft facing said thrust bearing surface includes a convex spherical surface.

5. A hydro-dynamic fluid bearing device according to claim 1, wherein said fluoric lubricant includes 0.1 to 10 wt. % perfluoropolyether having carboxylic acid as terminal group.

6. A hydro-dynamic fluid bearing device according to claim 5, wherein one of a thrust bearing surface of a bottom of said cylindrical hole and an end portion of said shaft facing said thrust bearing surface includes grooves for generating hyrdo-dynamic fluid.

7. A hydro-dynamic fluid bearing device according to claim 5, wherein said bottom surface of the cylindrical hole and an end portion of said shaft facing said bottom surface are provided as a thrust receiving surface and a thrust surface respectively.

8. A hydro-dynamic fluid bearing device according to claim 7, wherein said bottom surface of the cylindrical hole includes a convex spherical surface.

9. A hydro-dynamic fluid bearing device according to claim 5, wherein one of a thrust bearing surface of a bottom of said cylindrical hole and an end portion of said shaft facing said thrust bearing surface includes a convex spherical surface.

10. A hydro-dynamic fluid bearing device according to claim 5, wherein one of a thrust bearing surface of a bottom of said cylindrical hole and an end portion of said shaft facing said thrust bearing surface includes a protrusion.

11. A hydro-dynamic fluid bearing device according to claim 10, wherein said protrusion has a flat end surface.

12. A hydro-dynamic fluid bearing device according to claim 1, wherein one of a thrust bearing surface of a bottom of said cylindrical hole and an end portion of said shaft facing said thrust bearing surface includes grooves for generating hyrdo-dynamic fluid.

13. A hydro-dynamic fluid bearing device according to claim 1, wherein said bottom surface of the cylindrical hole and an end portion of said shaft facing said bottom surface are provided as a thrust receiving surface and a thrust surface respectively.

14. A hydro-dynamic fluid bearing device according to claim 13, wherein said bottom surface of the cylindrical hole includes a convex spherical surface.

15. A hydro-dynamic fluid bearing device comprising a cylindrical shaft, a substantially cylindrical bearing member for axially supporting the shaft rotatably in a cylindrical hole having a bottom surface, a supporting member fixed on one side of the shaft and the bearing member, and a rotation member fixed on the other side of the shaft and the bearing member and rotatably supported on the supporting member, grooves for generating hydro-dynamic fluid being formed on at least one of the outer peripheral surface of the shaft and the inner peripheral surface of the cylindrical hole of the bearing member, wherein the bearing member is made of a resin material by injection molding and has the grooves for generating hydro-dynamic fluid on the inner peripheral surface thereof; the resin material is injected substantially at the center of the surface opposite to the bottom surface of the cylindrical hole; the inner peripheral surface of the cylindrical hole is in the range of 2 to 5 mm; the thickness of the resin material of the bearing member, of which the inner peripheral surface is made, is in the range of 0.8 to 2 mm; and the grooves for generating hydro-dynamic fluid are formed by doing mold release at the injection molding by forced drawing from a core pin by which the grooves for generating hydro-dynamic fluid are previously formed.

16. A hydro-dynamic fluid bearing device according to claim 15, wherein said resin material includes polyphenylene sulfide resin, carbon fibers and one or more fillers other than the carbon fibers.

17. A hydro-dynamic fluid bearing device according to claim 16, wherein the total content of said carbon fibers and said fillers is 20 to 50 wt. % and the melt index of said resin material is 4 to 9 g/min. at a temperature of 300° C. and a load of 5 kg.

* * * * *

UNITED STATES PATENT AND TRADEMARK OFFICE
CERTIFICATE OF CORRECTION

PATENT NO. : 6,074,098
DATED : June 13, 2000
INVENTOR(S) : Hiromitsu ASAI et al.

It is certified that error appears in the above-identified patent and that said Letters Patent are hereby corrected as shown below:

On the Title page:
After the application filing date, please insert the following:
[30] Foreign Application Priority Data
    Mar. 5, 1997     [JP]     Japan.........................9-050088
    Apr. 10, 1997     [JP]     Japan.........................9-092319
    May 1, 1997     [JP]     Japan.........................9-113862

Signed and Sealed this

Twenty-fourth Day of April, 2001

Attest:

NICHOLAS P. GODICI

*Attesting Officer*      *Acting Director of the United States Patent and Trademark Office*